United States Patent
Gubela, Sr. et al.

(10) Patent No.: US 7,717,575 B2
(45) Date of Patent: May 18, 2010

(54) LIGHT-REFLECTING TRIPLE, REFLECTOR, AS WELL AS METHOD FOR RECOGNIZING AN OBJECT

(75) Inventors: Hans-Erich Gubela, Sr., Sasbachwalden (DE); Hans-Erich Gubela, Jr., Sasbachwalden (DE); Markus Erwin Huber, Sasbachwalden (DE); Simon Weingärtner, Kappelrodeck (DE)

(73) Assignee: IMOS Gubela GmbH, Renchen (DE)

( * ) Notice: Subject to any disclaimer, the term of this patent is extended or adjusted under 35 U.S.C. 154(b) by 326 days.

(21) Appl. No.: 11/922,641

(22) PCT Filed: Jun. 21, 2006

(86) PCT No.: PCT/EP2006/005932
§ 371 (c)(1),
(2), (4) Date: Dec. 20, 2007

(87) PCT Pub. No.: WO2006/136381
PCT Pub. Date: Dec. 28, 2006

(65) Prior Publication Data
US 2009/0097118 A1    Apr. 16, 2009

(30) Foreign Application Priority Data
Jun. 23, 2005   (DE) .................. 10 2005 063 331

(51) Int. Cl.
*G02B 5/122* (2006.01)
(52) U.S. Cl. .................. 359/529; 359/530; 359/558
(58) Field of Classification Search .......... 359/529–530
See application file for complete search history.

(56) References Cited

U.S. PATENT DOCUMENTS

| | | | |
|---|---|---|---|
| 1,671,086 A | 5/1928 | Stimson | |
| 1,743,834 A | 1/1930 | Stimson | |
| 1,743,835 A | 1/1930 | Stimson | |
| 2,472,782 A | 6/1949 | Albersheim | |
| 3,833,285 A | 9/1974 | Heenan | |
| 5,171,624 A | 12/1992 | Walter | |
| 5,180,910 A | 1/1993 | Spratte et al. | |
| 5,866,236 A | 2/1999 | Faykish et al. | |
| 6,353,489 B1 * | 3/2002 | Popovich et al. | 359/15 |
| 2002/0154423 A1 | 10/2002 | Gubela, Sr. | |

FOREIGN PATENT DOCUMENTS

| | | |
|---|---|---|
| DE | 41 17 911 A1 | 12/1991 |
| DE | 101 19 671 A1 | 10/2002 |
| DE | 102 28 013 A1 | 1/2004 |
| EP | 0 476 361 A2 | 3/1992 |
| FR | 1240121 | 7/1959 |
| JP | 04318502 A | 11/1992 |

* cited by examiner

*Primary Examiner*—James Phan
(74) *Attorney, Agent, or Firm*—Collard & Roe, P.C.

(57) ABSTRACT

The invention relates to a triple prism which reflects light, a reflector and to a method for recognizing an object. A reflective photoelectric barrier sends light to a reflector. The reflector does not answer with the form of the obtained light signal, but with a double signal which projects two light centers. The reflector can also be embodied such that it answers with a different geometric figure than the light projection. The reflector with a modified signal enables a sensor system to be produced and which can verify, by evaluating the light signal captured by the reflector, whether the captured signal of the reflector or another reflection.

16 Claims, 3 Drawing Sheets

LIGHT-REFLECTING TRIPLE, REFLECTOR, AS WELL AS METHOD FOR RECOGNIZING AN OBJECT

CROSS REFERENCE TO RELATED APPLICATIONS

Applicants claim priority under 35 U.S.C. 119 of German Application No. DE 10 2005 063 331.5 filed Jun. 23, 2005. Applicants also claim priority under 35 U.S.C. 365 of PCT/EP2006/005932 filed Jun. 21, 2006. The international application under PCT article 21(2) was not published in English.

The invention relates to a reflector that consists of one or of a plurality of triples, and is preferably configured for use in sensor systems, but also demonstrates advantages for road traffic and similar signal tasks.

In sensor systems, reflection light barriers are used in which transmitters and receivers of the emitted light signal are generally in one housing, and the emitted light falls onto a reflector that reflects the light in the direction of the light source. In order to make sure that the received light actually comes from the reflector and not from another light source or random reflection by another object, polarized light is preferably used. The polarized light is rotated in a reflector composed of triples, and reflected to the receiver. The light signal can be identified as coming from the triple reflector by means of the location of the polarization. This security device by means of evaluation of the polarization direction of the reflected light is frequently ineffective nowadays, because packaging films on packages, for example, can also produce random polarization directions of outside light. In addition, the safety clothing of persons is often provided with reflective surfaces that are formed from small triples. These also make it possible to rotate the light emitted by the light barrier, so that the receiver in the light barrier is deceived. There is hardly any security any more that the received light signal actually comes from the reflector being aimed at.

The task of the invention is the creation of a sensor system that ensures, when a reflector is used, that the received signal actually comes from the reflector being aimed at. In addition, the reflector is also supposed to make the previous polarization rotation possible, in order to be able to continue to use the conventional detection method.

In order to be able to use this new sensor system for the observation of projections, a reflector according to the invention is proposed, which can modify the signal received by the sensor system, as a reflection. This modified signal can actually project any desired figure, preferably a point-symmetrical figure, when the diffraction method is used (FIG. 4 to FIG. 7).

The method for the sensor system.

The transmitter of the sensor system, in the function of a light barrier, transmits a bundled beam of light (light input signal) having a diameter of 5 mm, for example. The reflector according to the invention now responds with a modified light output signal that produces a clearly recognizable projection, which the receiver in the sensor can evaluate. The evaluation of the projection received by the receiver of the sensor system can take place, in simple manner, by way of an inexpensive camera chip having a low number of pixels, or simply by means of disposing several individual reception elements.

The method according to the invention, for the sensor system, is that the projection is received, and, in practical manner, that an additional check is performed, at the same time, with at least one pixel or one reception element, as to whether a light signal outside of the expected projection is received. If this is the case, the sensor system recognizes that an outside light or an outside reflection is present. This principle of a simultaneous positive check, namely receiving the expected projection, and of an additional negative check, namely observing an interference by means of outside light, outside of the expected projection, where no light is allowed to come in, makes the method so reliably secure for the sensor system.

In the following, a simple projection of two points is selected, using the recurring example of the angle method (FIG. 1 to FIG. 3), in order to be able to explain details.

The size of the projection is dependent on the distance of the projection surface, in other words of the receiver of the sensor system, because the modified light output signal is based on angle functions of the reflection surfaces in the triple. However, for the practical use of light barriers over an observation distance of about 4 m, a slight angle deviation from a right angle of two partial surfaces 2 and 3 of the triple from one another is already sufficient for the projection of two points, for example. So that in this example, two clearly separate points are projected.

The three partial surfaces that form the first triple are called mirrors or mirror surfaces here, in the following. The required angle deviation from the right angle of the second and third mirror surfaces 2 and 3 relative to one another is already clearly effective at about 2 to 120 arc minutes, as a similar positive or negative deviation from the right angle.

The reflector according to the invention.

A reflector is proposed that modifies the light signal that hits it from the light source, and reflects the signal in the direction to the receiver of the sensor.

The core idea of the reflector according to the invention is therefore that of changing a light input signal that hits a reflector, in such a manner that the reflector responds with a modified projection (light output signal). This property makes it possible for the method to check, with regard to the sensor system, whether the received light signal corresponds to the expected signal, in terms of its shape, or deviates from it.

The reflector consists of a triple (FIG. 1) or preferably of a triple array (FIG. 2). The triple array permits the production of a larger reflective surface, which demonstrates a similar effect over its entire area.

Furthermore, the triple array can be composed of triples that are rotated with regard to one another, or rows of triples, which are joined together, if the modified signal is supposed to be projected in different positions in the case of large-area illumination of triples having different positions. Thus, for example, two or three modified signals or signal figures would be projected, rotated relative to one another in accordance with the triple positions.

Almost all known reflection triples can be used as the shape of the triple. However, those triple shapes that come particularly close to the cubical triple (FIG. 1) are to be preferred, so that as few interference beams as possible are formed, which could interfere with the representation or the recognition of the double signal by means of additional light signals. In contrast, for example, the double signal would be imaged multiple times by means of the use of a pyramidal triple array.

The reflector according to the invention can also be used very well in road traffic. This is because it makes it possible to transmit the incident headlight light in several directions at the same time, in excellent manner. Thus, the reflector can be disposed in such a manner that the driver of a low passenger car and, at the same time, the driver of a high truck, recognize the reflector more clearly, because of the selected shape of the light projection of the reflector.

In the case of triple arrays that are joined together from triples having different rotation, or are provided from triples according to the invention having different opening angles of the second and third mirror surface 2 and 3, targeted light distribution can take place.

In the following, the invention will be explained in greater detail using exemplary embodiments shown schematically in the drawing.

The different configurations of the reflector according to the invention and the related method for the sensor system can be explained in the following, by means of the figures.

These show

Figure 1:
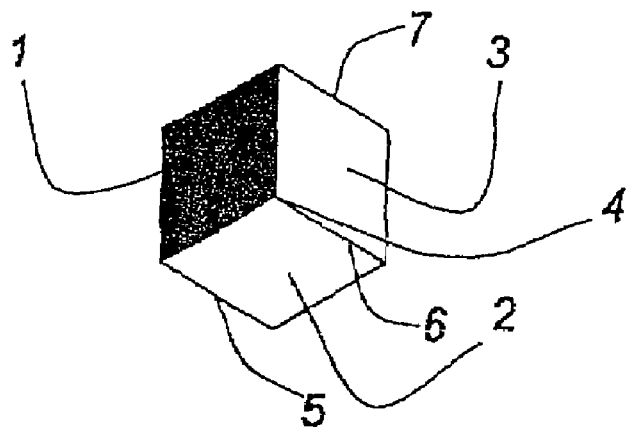
FIG. 1 to FIG. 3 illustrate the angle method.

FIG. 1 shows a so-called full-cube triple that would consist, in its ideal shape, of three square partial surfaces, namely the first, the second, and the third mirror surface 1, 2, 3, with the triple center 4. In the ideal shape, the three mirrors would stand at a right angle to one another. The reflector according to the invention deviates from this.

The second and the third mirror surface 2 and 3 form an opening angle of greater or less than 90°, preferably of greater than 90°. However, they stand at a right angle to the first mirror surface 1. Of course there are tolerances in production practice, so that the right angle indicated here could deviate slightly.

The edges 5 and 6 delimit the second mirror surface 2, the edges 6 and 7 delimit the third mirror surface 3.

Figure 2:
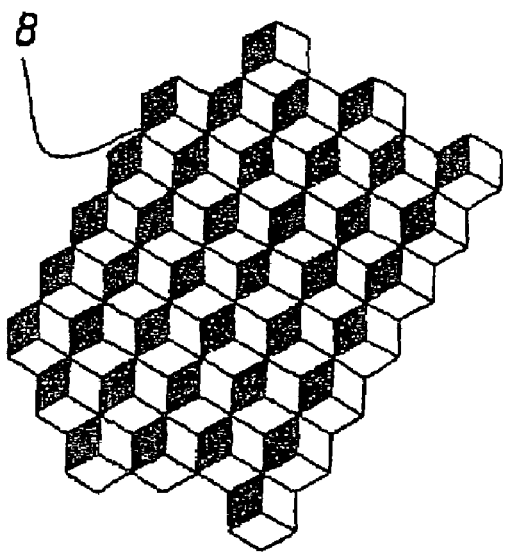

FIG. 2 shows a triple array, formed from the triples of FIG. 1. This triple array has the advantage of making a large area available for the incident light signal. If a laser light is used, for example, which is difficult to align over greater distances, the triple array offers an enlarged target area. Since all of the triples are of the same composition in this example, the triple array will always modify and reflect the light in the same manner, independent of where the laser beam hits the triple array.

Figure 3:
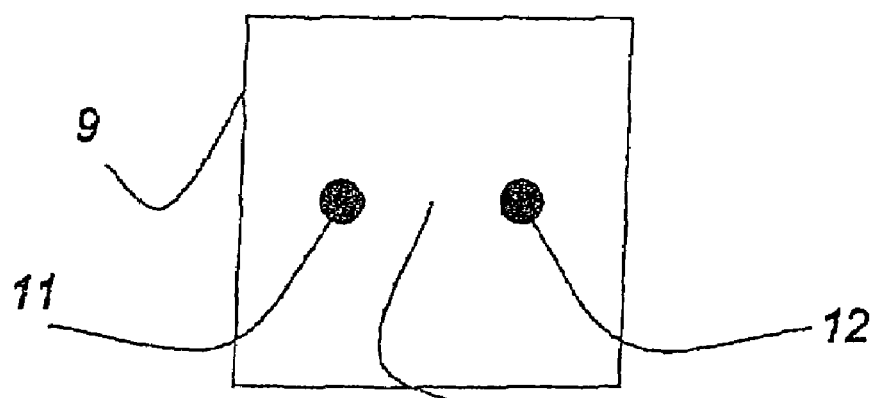

FIG. 3 shows a light reception surface 9 for the reflected light and an exemplary projection of the double signal produced by the reflector. It is assumed that a light transmitter is disposed behind the partially transparent light reception surface 9, in the center 10, which transmits coherent light in the form of a circular beam of light, for example, to the reflector according to the invention. The reflector now responds to this light input signal with two clearly separated light centers 11 and 12 as the light output signal, which it projects onto the light reception surface.

Figure 4:
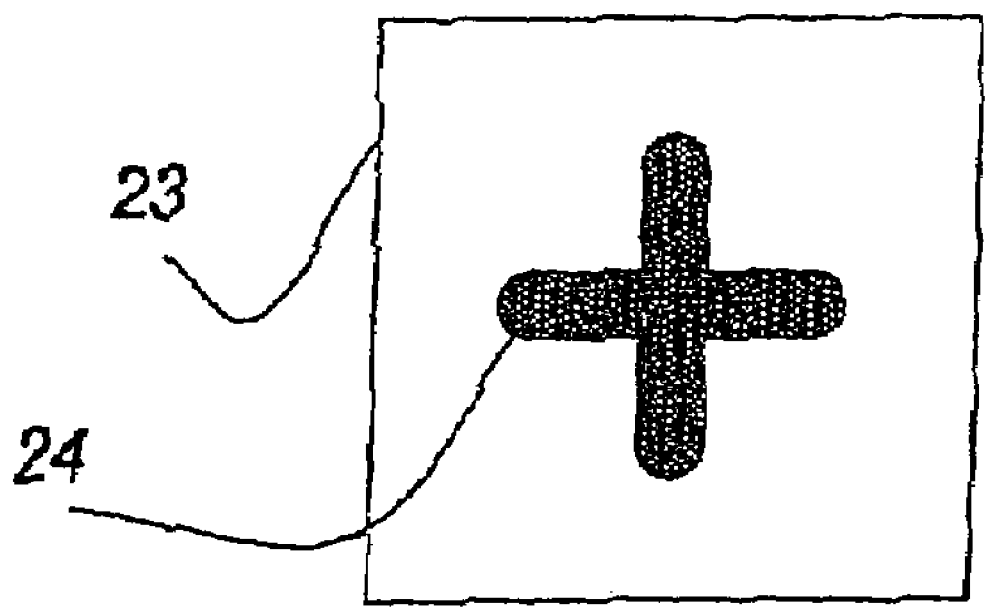
FIG. 4 to FIG. 7 illustrate the diffraction method.

FIG. 4 shows a projection surface 23 on which a cross symbol 24 produced by means of the diffraction method according to the invention appears. Of course, the light emitted by the sensor must be coherent for this purpose. Now almost all possible projection patterns can be produced by means of diffraction. But here again, another teaching according to the invention must be observed for structuring the reflector, as will be explained in FIG. 5.

Figure 5:
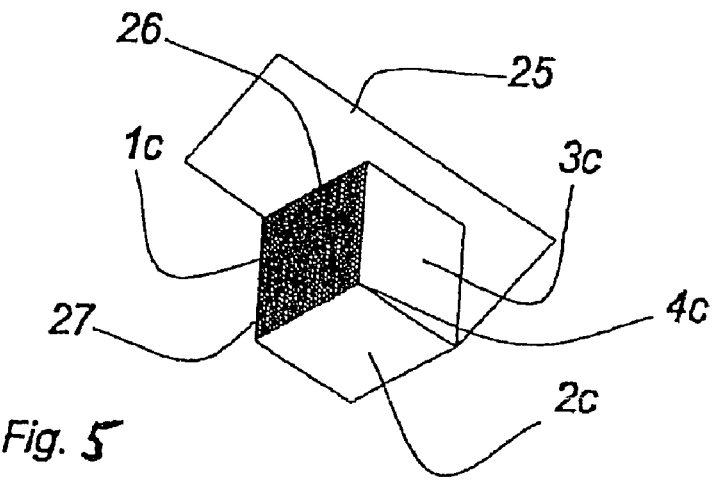

FIG. 5 shows a full-cube triple having a first, a second, and a third reflection surface 1c, 2c, and 3c. All of the mirrors stand at a right angle to one another in this example. However, the mirrors can also possess different angles or formats. The triple variations are of no importance here for an explanation of the diffraction method according to the invention.

A transparent film 25 lies above the light entry surface of the triple and covers it by 50%. The characterization of the diffraction pattern in the film will not be discussed here, in order to keep the presentation clear to the reader.

The first mirror 1c is covered by half, the second mirror 2c lies free, and the third mirror 3c is completely covered by the film used as an example. This transparent film contains a diffractive structure having a pixel size of 10 to 60 micrometers, for example. The sensor transmits a coherent bundle of light to the triple. The light that hits the triple, 50% of it, hits the diffractive structure, penetrates into the glass body of the triple, hits the covered partial mirror surface 26 of the first mirror 1c or the third mirror 3c, and is continuously retroflected over all three mirrors. The light leaves the triple by way of the non-covered partial mirror surface 27 of the first mirror 1c or the second mirror 2c, which is not covered by the film used as an example.

Another 50% of the light that comes from the sensor hits the partial mirror surface 27 that is not covered by the film, and the second mirror 2c, and leaves the triple by way of that partial mirror surface 26 and mirror 3c that is covered by the film.

In the case of all six possible light paths, the light passes through the diffractive structure only once, although it runs over three mirrors in the triple. A clear projection as in FIG. 4 is only possible with the rule that the light penetrates the diffractive structure only once.

If the cover of the triple were selected to be larger, lack of clarity would occur, going as far as the projection of exclusively diffuse light. If the cover is selected to be less than 50% of the light entry surface of the triple, less incident light participates in the diffraction, and an interfering light spot will occur in the projection of the figure contained in the diffraction, or blanketing with light not influenced diffractively will occur.

Instead of a diffraction film 25, the diffractive structure can also be formed directly on the light entry surface of the triple, in that the diffractive structure is introduced directly into the surface of the plastic injection mold. This can also take place by means of placing a nickel cast into the mold. The practical use of the diffraction method according to the invention for plastic reflectors that consist of a plurality of triples is shown by the following figure.

Figure 6:
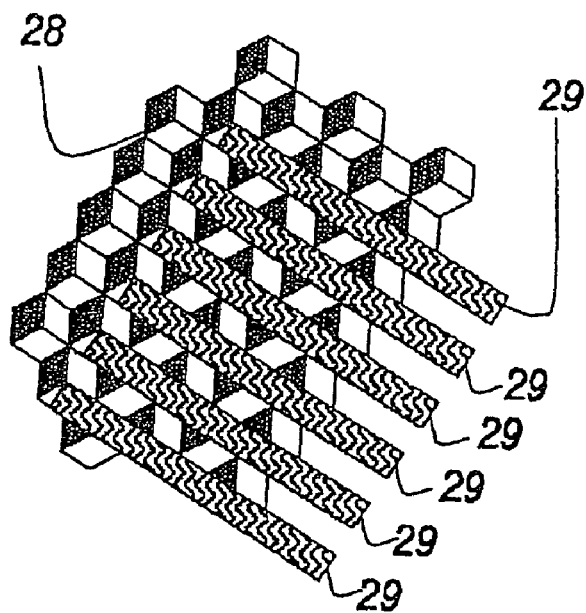

FIG. 6 shows a triple array 28 as a cutout of a plastic reflector having full-cube triples. Films having a diffractive structure 29 are laid over the triples in strip form, for example, or preferably, the light entry surface of the reflector is directly provided with a diffractive structure 29. The diffractive structures optimally cover 50% of the light entry surface of the triples. For reasons of a more comprehensible representation, the triple array and the diffractive structures are shown offset.

The reflector according to the invention, for the projection of a projection FIG. 24 produced by means of a diffractive structure, as shown in FIG. 4, is therefore covered by optimally 50% of its light entry surface, in accordance with the rule explained in FIG. 5.

Figure 7:
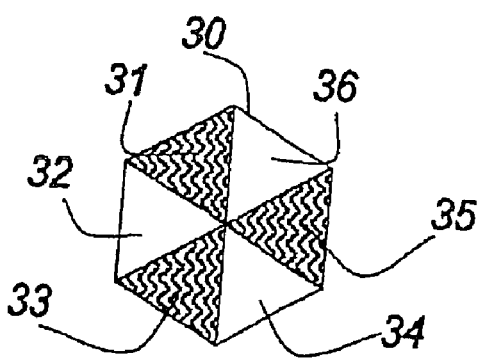

FIG. 7 shows a cover pattern for the triple. Aside from the strip-shaped cover, other cover patterns for the individual triple are also suitable, for example in the form of a three-bar cross, such as that on the warning signs for "Caution—Radioactivity." No matter how the cover of the triple is configured, all six possible fundamental light paths through the triple should run in such a manner that the diffractive structure is optimally penetrated by the coherent light only once and that a free part with regard to the triple center lies opposite every cover part.

The triple 30 consists of the partial mirror surfaces 31, 32, 33, 34, and 35, 36, whereby a first pair of partial surfaces 31, 32 forms the first mirror, a second pair of partial surfaces 33, 34 forms the second mirror, and a third pair of partial surfaces 35, 36 forms the third mirror.

The partial surfaces 31, 33, 35 are covered by means of the diffractive structure on the light entry surface, the partial surfaces 32, 34, 36 are free.

In summary, the following should be stated:

A reflection light barrier transmits light to a reflector. The reflector responds not in the form of the light signal received, but rather responds with a double signal that projects two light centers. The reflector can also have such a composition that it responds with a different geometric figure as a light projection. The reflector with the modified signal makes it possible to structure a sensor system that can verify, by means of the evaluation of the light signal received from the reflector, whether the received signal comes from the reflector or from an outside light source or from an outside reflection.

What is claimed is:

1. Light-reflecting triple having a first, a second, and a third mirror surface (1, 2, 3; 1c, 2c, 3c), whereby its light entry surface is partially covered with a transparent cover element (25) having a diffraction pattern, wherein the cover element (25) covers half of the light entry surface and a non-covered partial surface of the triple lies opposite a covered partial surface, in the beam path, in such a manner that the light penetrates the cover element (25) at most once.

2. Light-reflecting triple according to claim 1, wherein the first mirror surface (1, 1c) is covered by half and the third mirror surface (3, 3c) is completely covered by the cover element (25).

3. Light-reflecting triple according to claim 1, wherein the cover element (25) has a delimitation line that has the same coverage as the edge between the second and the third mirror surface (2, 3; 2c, 3c).

4. Light-reflecting triple according to claim 1, wherein each of the mirror surfaces (1, 2, 3; 1c, 2c, 3c) are is covered by half by the cover element.

5. Light-reflecting triple according to claim 1, wherein the first and the second mirror surface (1, 2; 1c, 2c) as well as the first and the third mirror surface (1, 3; 1c, 3c) stand perpendicular to one another, that the second and the third mirror surface (2, 3; 2c, 3c) are disposed at an angle to one another that differs from 90, and that the second and the third mirror surface (2, 3, 2c, 3c) have an identical shape and size.

6. Light-reflecting triple according to claim 1 wherein the second and the third mirror surface (2, 3; 2c, 3c) are square, in each instance.

7. Light-reflecting triple according to claim 5, wherein the second and the third mirror surface (2, 3; 2c, 3c) are disposed at an angle relative to one another that deviates by at least one minute and at most nine degrees from a right angle.

8. Light-reflecting triple according to claim 1, wherein it is produced from glass, such as float glass, borosilicate glass, or quartz glass, or from plastic, such as polymethyl methacrylate (PMMA), polyvinyl chloride (PVC), polycarbonate (PC), or styrene.

9. Light-reflecting triple according to claim 1, wherein it is produced from metal, such as gold, silver, aluminum, nickel, brass, copper, bronze, new silver, titanium, lead, or steel, or by means of vapor deposition of a shape-giving support body made of plastic, glass, or metal, with one of the aforementioned materials.

10. Light-reflecting triple according to claim 1, wherein it has a polarization filter at its light entry surface.

11. Reflector having a plurality of light-reflecting triples according to claim 1.

12. Reflector according to claim 11, wherein the triple axes of the light-reflecting triples are disposed in at least two different orientations.

13. Reflector according to claim 11, wherein the second and third mirror surfaces (2, 3; 2c, 3c) are disposed in at least two different angles relative to one another.

14. Method for recognizing an object provided with a light-reflecting triple or a reflector according to claim 11, whereby a light input signal is transmitted onto the object by means of a light source, and whereby a reflected light output signal is detected on a light reception surface (10; 23), by means of a detector, and compared with a reference signal stored in memory.

15. Method according to claim 14, wherein the object is considered to have been recognized if the light output signal agrees with the reference signal.

16. Method according to claim 14, wherein the object is considered to have been recognized if the light output signal agrees with the reference signal and another reference signal stored in memory is not detected.

* * * * *